United States Patent [19]

Schubert

[11] Patent Number: 5,380,362

[45] Date of Patent: Jan. 10, 1995

[54] SUSPENSION FOR USE IN ELECTROPHORETIC IMAGE DISPLAY SYSTEMS

[75] Inventor: Frederic E. Schubert, Shoreham, N.Y.

[73] Assignee: Copytele, Inc., Huntington Station, N.Y.

[21] Appl. No.: 92,749

[22] Filed: Jul. 16, 1993

[51] Int. Cl.⁶ .................................. C08K 13/06
[52] U.S. Cl. ........................... 106/493; 106/499; 106/502; 106/504
[58] Field of Search ............... 106/493, 499, 502, 504

[56] References Cited

U.S. PATENT DOCUMENTS

| | | | |
|---|---|---|---|
| 3,612,758 | 10/1971 | Evans | 178/5.4 R |
| 4,093,534 | 6/1978 | Carter et al. | 350/355 |
| 4,285,801 | 8/1981 | Chiang | 204/299 R |
| 4,298,448 | 11/1981 | Müller et al. | 204/299 R |
| 4,309,081 | 1/1982 | Camlibel et al. | 350/357 |
| 4,655,897 | 4/1987 | DiSanto et al. | 204/299 |
| 4,680,103 | 7/1987 | Solomon et al. | 204/299 R |
| 5,206,108 | 4/1993 | Felder et al. | 430/137 |

OTHER PUBLICATIONS

Journal of Applied Physics (1978) vol. 49, No. 9, "The Understanding and Elimination of Some Suspension Instabilities in an Electrophoretic Display", P. Murau and B. Singer.

Applied Spectroscopy (1979), vol. 33, No. 2, "Identification of a Charging Mechanism Using Infrared Spectroscopy", B. Fitzhenry.

Journal of the American Chemical Society (1982) vol. 15, "Mechanism of Electric Charging of Particles in Nonaqueous Liquids", F. M. Fowkes, et al.

Journal of the American Chemical Society (1984) vol. 21, "Steric and Electrostatic Contributions to the Colloidal Properties of Nonaqueous Dispersions", F. M. Fowkes and R. J. Pugh.

P. L. Tang, *Miniemulsion Polymerization-A Comparative Study of Preparative Variables,* Journal of Applied Polymer Sciences, vol. 43, (1991) pp. 1059-1066.

*Primary Examiner*—Mark L. Bell
*Assistant Examiner*—Scott L. Hertzog
*Attorney, Agent, or Firm*—Arthur L. Plevy

[57] ABSTRACT

The invention provides a working fluid for an electrophoretic image display device including a dispersion of finely divided diarylide yellow pigment particles each having a charge of a given polarity and acidic hydrogen surface sites in a suspension medium. Each of the pigment particles are transportable within the suspension medium, under the influence of an electric field, toward or away from at least one transparent plate. Adsorbed on the surface of each pigment particle is a thin layer of a charge control agent having a polyisobutylene chain and a basic anchoring group which reacts with the acidic surface sites to form charge pairs therewith. The polyisobutylene chains extend from the pigment surfaces on which the charge control agent is adsorbed, thereby providing a steric barrier between pigments and preventing agglomeration. The specific gravity of the suspension medium is matched with that of the pigment particles by combining effective amounts of secondary butyl benzene and tetrachloroethylene. A blue solvent dye is added to absorb substantially all light scattered by the pigments when the pigments are transported moved away from the transparent plate being viewed.

15 Claims, 2 Drawing Sheets

SUSPENSION FOR USE IN ELECTROPHORETIC IMAGE DISPLAY SYSTEMS

FIELD OF THE INVENTION

The present invention relates to an electrophoretic display composition for display systems, electrostatic printing or the like and a corresponding method of manufacturing a suspension used therein. More particularly, the present invention relates to a suspension which utilizes steric stabilization to prevent pigment particle flocculation.

BACKGROUND OF THE INVENTION

The electrophoretic effect is well known and the prior art is replete with a number of patents and articles which describe the effect. As will be recognized by a person skilled in the art, the electrophoretic effect operates on the principle that certain particles, when suspended in a medium, can be electrically charged and thereby caused to migrate through the medium to an electrode of opposite charge. Electrophoretic image displays (EPIDs) utilize the electrophoretic effect to produce desired images.

EPIDs generally comprise a suspension of colored charged pigment particles dispersed in a dyed solvent of contrasting color, which is injected into a cell consisting of two parallel and transparent conducting electrode panels. The charged particles are transported and packed against one electrode under the influence of an electric field, so that the viewer may see the color of the pigment. When the polarity of the field is reversed, the pigment particles are transported and packed on the opposite electrode. If the optical density of the dyed solvent is high enough to absorb the light scattered by the particles residing on the rear electrode, the observer will perceive the color of the dyed solvent. The performance of the resulting display is strongly dependent upon the suspension stability.

In non-aqueous dispersions colloid particles generally owe their stability to the fact that their surfaces are charged and, hence, repel each other. When the particles are uncharged, the dispersion is unstable. The fact that a colloidal particle bears a net surface charge is not a sufficient condition for stability because electroneutrality demands that the particle plus its immediate surroundings bear no net charge. In other words, the surface charge must be compensated by an equal but opposite counter charge, so that surface charge and counter-charge together form an electrical double layer. P. Murau and B Singer, in an article appearing in Vol. 49, No. 9 of the Journal of Applied Physics (1978) and entitled "The Understanding and Elimination of Some Suspension Instabilities in an Electrophoretic Display", indicate that when the double layer is compressed, the particles can approach each other to within a few hundred angstroms before repulsion is felt whereupon the van der Waals attraction becomes so strong that aggregation occurs.

The interactions of particle surfaces and charge control agents in colloidal suspensions has been the subject of considerable research. Reference is made to an article entitled "Mechanism of Electric Charging of Particles in Nonaqueous Liquids" appearing in Vol. 15 of the Journal of the American Chemical Society (1982), wherein F. M. Fowkes et al discuss the mechanism of electrostatic charging of suspended acidic particles by basic dispersants in solvents of low dielectric constant. Reference is also made to an article entitled "Steric and Electrostatic Contributions to the Colloidal Properties of Nonaqueous Dispersions" appearing in Vol. 21 of the Journal of the American Chemical Society (1984) wherein F. M. Fowkes and R. J. Pugh discuss the importance of anchoring sites for steric stabilizers in minimizing particle flocculation. The essential point developed by these references is that particle surface interactions are acid-base in character. Acidic pigment surface sites and basic charge control agents yield negative pigment surface charge. On the other hand, basic pigment surface sites and acidic charge control agents yield positive pigment surface charge.

Since electrophoretic devices utilize low polarity liquids in which ionization of ordinary organic acids and salts is negligible (approximately $10^{-10}$ moles per liter), the charge of the particle is governed by trace impurities unless otherwise controlled by adsorbing on the pigment surface a suitable charge control agent. This amount of charge, although sufficient for electrophoretic activity may still be inadequate for electrostatic stabilization of the suspension. If the charge control agent is also polymeric, or a polymeric dispersant is present in addition, the colloid stability can be further enhanced.

Over recent years, attention has therefore been directed to dispersion stabilization by way of adsorbed polymers on particle surfaces. If two colloidal particles coated with adsorbed layers of polymers approach each other, steric repulsion can occur as soon as the polymer layers start to penetrate. According to Murau and Singer, the polymer molecules adsorbed on a colloidal particle never lie flat on the surface. Rather, parts of the long chains (loose-ends, side branches, and loops) are free from the surface and surrounded by liquid. The overlapping of the polymer chains upon close approach can be pictured as a localized increase in the polymer concentration. This case is thermodynamically less favorable then the "dilute" situation existing when particles are far apart.

As will be recognized by a person skilled in the art, the selection of the electrophoretic particles used in the EPID is very important in determining the performance of the EPID and the quality of the viewed image produced. Ideally, electrophoretic particles should have an optimum charge/mass ratio, which is dependent upon the particle size and surface charge, in order to obtain good electrostatic deposition at high velocity as well as rapid reversal of particle motion when voltages change. Additionally, it is desirable to utilize electrophoretic particles that have essentially the same density as the fluid medium in which they are suspended. By using electrophoretic particles of essentially the same density as the suspension medium, the migration of the electrophoretic particles through the medium remains independent of both the orientation of the EPID and the forces of gravity.

To effect the greatest optical contrast between electrophoretic particles and the suspension medium, it is desirable to have either light-colored particles suspended in a dark medium or black particles suspended in a backlighted clear medium. In the prior art, it has been proven difficult to produce black electrophoretic particles that are dielectric, of uniform size and have a density matching that of a common suspension medium. As a result, EPIDs, commonly use readily manufactured light colored electrophoretic particles suspended in dark media. Such EPIDs are exemplified in U.S. Pat. Nos.: 4,655,897 to DiSanto et al., 4,093,534 to Carter et al., 4,298,448 to Muller et al., and 4,285,801 to Chaing. In such art, the light colored particles are commonly inorganic pigments. Titanium dioxide, for example, has been used in EPIDs to produce a good optical contrast between the white particles and the colored suspension medium. However, it has a density about 4 g/cm$^3$ which is too high to match with any organic liquid to prevent the sedimentation problem. In the past decade, great effort has been made to solve the density problem of titanium dioxide. However, very little work has succeeded without trading off the quality of the images, especially in regard to the whiteness. Coating titanium dioxide particles with a polymeric material to reduce the density of titanium dioxide is an example.

It is an object of the present invention to produce stable suspensions suitable for use in EPIDs, the suspension also having high electrophoretic sensitivity. It is a further object to produce light colored dielectric particles which may be used in such suspensions.

SUMMARY OF THE INVENTION

The invention provides a working fluid for an electrophoretic image display device including a dispersion of finely divided diarylide yellow pigment particles each having a charge of a given polarity and acidic hydrogen surface site in a suspension medium. Each of the pigment particles are transportable within the suspension medium, under the influence of an electric field, toward or away from at least one transparent plate. Adsorbed on the surface of each pigment particle is a thin film of a charge control agent having a polyisobutylene chain and a basic anchoring group which reacts with the acidic surface sites to form charge pairs therewith. The polyisobutylene chains extend from the pigment surfaces on which the charge control agent is adsorbed, thereby providing a steric barrier between pigment particles and preventing agglomeration. The specific gravity of the suspension medium is matched with that of the pigment particles by combining effective amounts of secondary butyl benzene and tetrachloroethylene. A blue solvent dye is added to absorb substantially all light scattered by the pigment particles when the pigments are transported away from the transparent plate being viewed.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing wherein.

DETAILED DESCRIPTION OF THE INVENTION

Although particles in accordance with the present invention can be used in many different applications where particles of yellow color and low density are desired, such as paint, ink and electrostatic toner, it is especially suitable for use in connection with electrophoretic image displays (EPID). Accordingly, the dielectric particles of the present invention will be described in connection with typical EPIDs.

Figure 1:
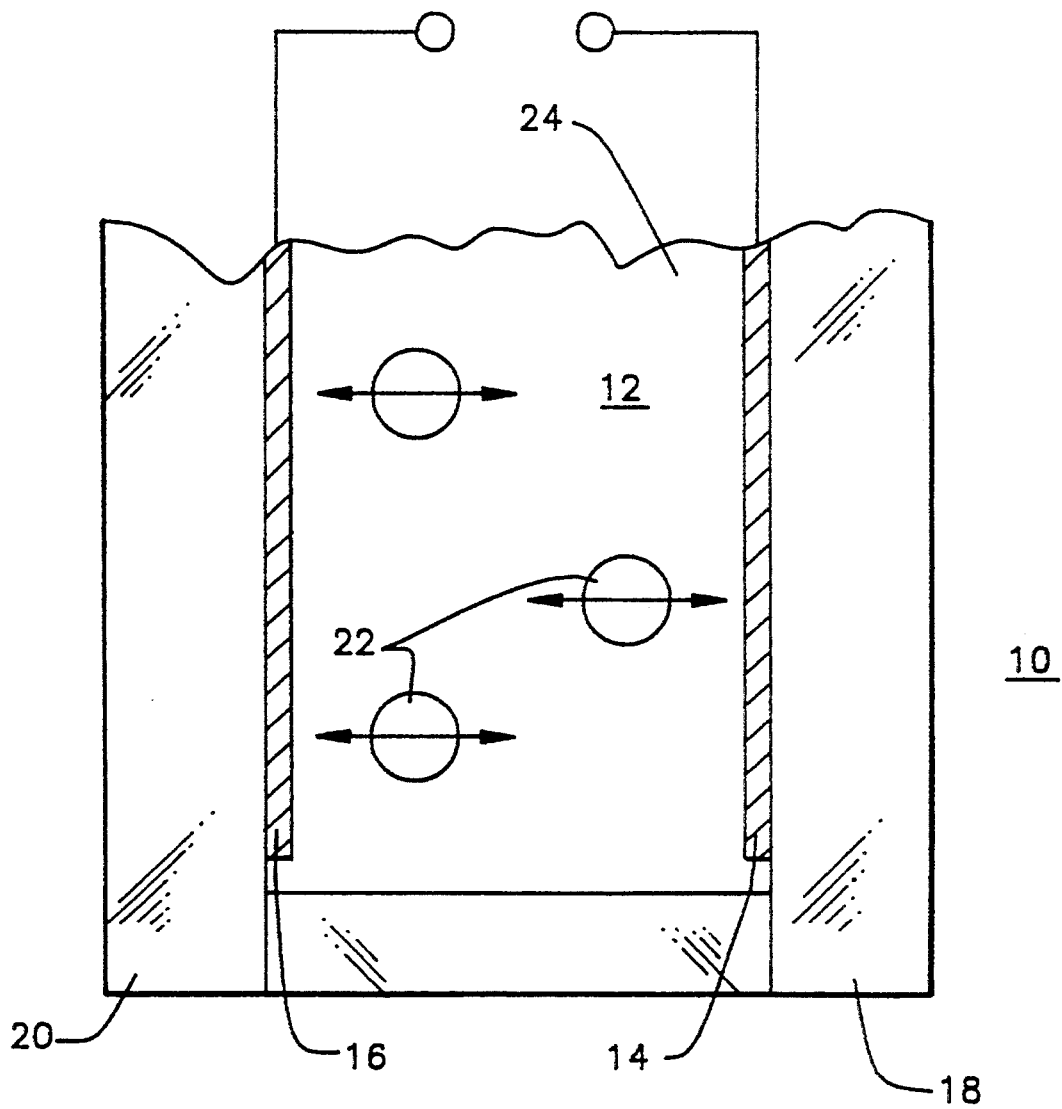
FIG. 1 is a diagrammatic, cross sectional view of an EPID having particles in accordance with the present invention.

Referring to FIG. 1, there is shown a cross-sectional view of a segment of a simple electrophoretic image display 10, magnified to show a single pixel (intersection). As will be recognized by a person skilled in the art, an EPID may contain a volume of an electrophoretic dispersion 12 disposed between an anode 14 and a cathode 16. The anode 14 and cathode 16 are deposited upon glass plates 18, 20 in the form of a thin layer of indium-tin-oxide (ITO) or a like compound. The ITO layer is deposited in such a manner as to be substantially transparent when viewed through the glass plates 18, 20.

With continuing reference to FIG. 1, the electrophoretic dispersion 12 comprises light colored electrophoretic particles 22 suspended in a dark colored medium 24. The electrophoretic particles 22 have a density substantially equivalent to that of the fluid medium 24 so as to remain randomly dispersed in the fluid medium 24, unaffected by the orientation of the EPID or the effects of gravity. When a sufficient electrical bias is applied between the anode 14 and cathode 16, the electrophoretic particles 22 migrate in response thereto to either the cathode 16 or anode 14 depending on polarity and displace the dark color medium 24 adjacent to the ITO layer, thereby creating a bright pixel. Reversing the voltage produces a dark pixel.

As noted previously, the production of light-colored image on a dark color background or a black image on a light background is highly desirable. However, a major obstacle to such a combination has been the lack of dielectric dark and light particles that have good hiding power and also a density that can be readily matched with common suspension fluids. In accordance with the present invention, the suspension is comprised of two yellow pigments which are density matched to, and dispersed in, a solvent medium of tetracholorethylene and secondary butyl-benzene. The composition and physical properties of an exemplary suspension, in accordance with the present invention, for an electrophoretic display is depicted in Table I.

TABLE I

| | |
|---|---|
| Diarylide Yellow (DY) pigment, #374-73, product of Sun Chemical Co., | concentration 0.4% (by wt) |
| Diarylide Yellow (DY) pigment, #374-74B, product of Sun Chemical Co. | concentration 0.4% |
| Solvent Blue 35 (SB35) blue dye, #30,643-6, product of Aldrich Co., 1,4-Bis(butylamino)-9,10-anthracenedione | concentration 0.12% |
| OLOA 1200 stabilizer and charging agent, product of Chevron Chemicals Co. | concentration 0.4% |
| Tetrachloroethylene and secondary-butyl benzene, background solvent adjusted to a specific gravity of | concentration 98.7% |

TABLE I-continued 1.43 g/ml

As discussed earlier, pigment particles can be prevented from agglomerating if either an electrostatic or a steric barrier exists between particles. In accordance with the illustrative embodiment of the present invention, the particles 22 are selected from a diarylide yellow pigment group in which an acidic hydrogen site exists on the carbon atom bonded to two carbonyls and an azo group. Pigments Yellow 14 (Diarylide Yellow AAOT) and Yellow 55 (Diarylide Yellow AAPT) have this acid site and may be used to prepare the novel suspension which is the subject of the present application. Other related diarylide molecules, such as Yellows 3, 13, 14, 16, and 17 have a similar acid site and may also be utilized.

Figure 2:
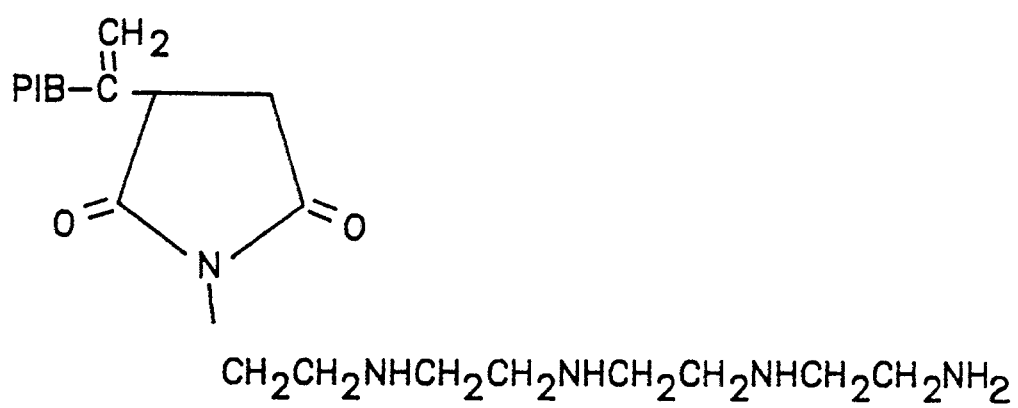
FIG. 2 is a representation of the chemical structure of a stabilizer and charge control agent utilized in an EPID suspension prepared in accordance with the present invention.

As noted above, acidic pigment surface sites and basic charge control agents yield negative pigment surface charge. On the other hand, basic pigment surface sites and acidic charge control agents yield positive pigment surface charge. Since the diarylide yellows comprising the pigment particles utilize an acidic site, the charge control agents for these materials must be basic in character. Excellent results, for example, have been obtained using Chevron OLOA 1200 as the charge control and stabilizing agent. The chemical structure of Chevron OLOA 1200 is depicted in FIG. 2. Although OLOA 1200 is the preferred charge control agent and stabilizer, other charge control agents, including basic barium sulfonate and several poly-vinyl pyridine block copolymers, may be utilized in effective amounts to achieve comparable results. OLOA 1200 is a polybutene succinimide with a basic anchoring group and a 50 angstrom long extended polyisobutylene chain. The long polyisobutylene chain allows OLOA to function as a steric stabilizer as well as a charge control agent. This dispersant is supplied as a 50 wt % solution in a mineral oil. It can be deoiled by adsorption from toluene onto silica with elution by acetone. The wt % of charge control agent given in Table I refers to the material as supplied. The basicity of OLOA 1200 has been evidenced by its interaction with the oil soluble acidic indicator due, Brom Phenol Magenta E (EK 6810) which is normally yellow but turns blue and then magenta with increasing basicity. The acidic form has an adsorption peak at 390 nm, the basic at 610 nm, and the isobestic point is at 460 nm. Attention has been focused on this molecules acid-base interaction in the aforementioned article by Murau and Singer and also in an article by B. Fitzhenry entitled "Identification of a Charging Mechanism using Infrared Spectroscopy" appearing in *Applied Spectroscopy*, Vol. 33, No. 2 (1979).

Besides reacting with the pigment to form charge pairs, the OLOA 1200 molecule also forms a polymeric layer on the surface of the pigment particles which prevents particle flocculation. The state with the polymeric chains extending out from the particle's surface into the solvent is thermodynamically more stable than the state with the polymeric surface chains on adjoining particles intertwining with one another. This phenomenon is called steric stabilization.

Figure 3:
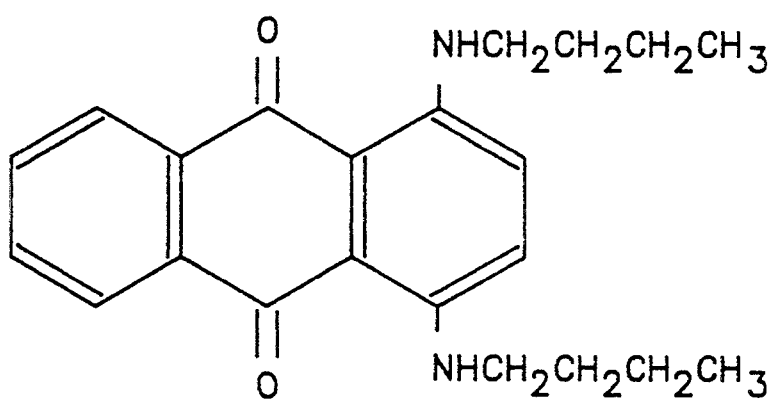
FIG. 3 is a representation of the chemical structure of a solvent dye which may be utilized in an EPID suspension prepared in accordance with the present invention.

Pigment motion in the suspension is not sufficient by itself to produce an image. A contrasting dye must be used to "hide" the pigment in dark areas of the image while the pigment itself produces the bright or yellow portion of the image. The pigment particles generate color by scattering light incident on them. While the particles scatter red, orange, yellow, and green light, the eye and brain of the observer integrate the various colors and the cumulative effect is a net yellow color. The dye, on the other hand, produces a color by absorbing all colors except blue or violet. This is a subtraction process. Accordingly, the ideal dye used in the display would have a sufficient optical density to absorb all of the light scattered by the pigment particles. In actual operation, some pigment scattered light will pass through the dye solution. However, the Solvent Blue 35 dye solution used in the illustrative embodiment of the present invention produces a very strong blue-black contrast to the yellow pigment. The chemical structure of the dye solution is depicted in FIG. 3. Similar anthraquinone dyes may also be used, for example, with other alkyl groups replacing the butyl group in Solvent Blue 35. An example is Oil Blue N, where the butyl group has been replaced by a pentyl group, can be used.

Another consideration in selecting the proper dye for the suspension is that the dye must not cause any detrimental side reactions therein. For example, interaction between dye and OLOA could produce highly mobile charged pairs, which are not visible and not properly regulated by the fields used to achieve image formation. The presence of such particles could severely and detrimentally affect fluid performance. Solvent Blue 35 has an amino group as its main reactive unit and can interact with the surface of the pigment without affecting fluid performance. Thus, selection of Solvent Blue 35 avoids any risk of reaction with the OLOA 1200, which has the same functional group.

The solvents utilized in the suspension of the present invention are tetrachloroethylene and sec-butyl benzene. Both compounds have high resistivity, a low dielectric constant, and are stable in electrical fields in the megavolt/meter range. The high specific gravity of tetrachloroethylene, 1.62 g/ml, allows specific gravity balancing to 1.43 g/ml with the less dense sec-butyl benzene. Further, neither solvent attacks the pigment at operating conditions. Another reason for the solvent choice is to arrive at a suspension viscosity which allows smooth pigment motion in the range of the applied field employed. At 20° C., the 1.43 g/ml specific gravity adjusted fluid has a viscosity of 1.4 centipoise. This proves to be a good central value to yield coordinated pigment motion over a range of temperatures from below 0° C. to 40° C.

Besides materials which are intentionally measured out and included in the suspension of the present invention, there are other materials which must also be considered. Trace impurities of polar materials, especially water, detrimentally effect the stability of suspensions in non-polar solvents. For example, water adsorbs on the particle surface and tends to affect not only the magnitude but also the sign of the particle mobility. Mobility measurements indicate that efforts to remove adsorbed surface water from Pigment DY-14 #374-73, by heating it in a vacuum oven prior to suspension preparation, lead to a decrease in pigment particle mobility in the final suspension. This is in comparison to Pigment 14 #374-73 which was allowed to equilibrate in a 51% humidity chamber prior to suspension preparation. A similar effect is not noted for Pigment DY 14 #374-74B.

As seen in Table 1, the two yellow pigments utilized in the suspension of the present invention are the same Yellow 14 diarylide molecule. Pigment #374-74B has been treated with a co-surfactant, hexadecane and a cationic surfactant, aerosol C61. These agents were present in the reaction mixture of the coupling reaction which formed the pigment molecule. The pigment #374-74B, when used as the exclusive pigment particle, produces suspensions with uncoordinated, turbulent particle motion. Suspensions using pigment #374-73 exclusively, on the other hand, produces suspensions with coordinated, smooth but slower, motion. Pigment #374-73 suspensions are also slower to move from an electrode when voltages are switched. Mixing these two pigments in a approximately 50:50 ratio produces suspensions far superior for EPIDs than those made from either pigment alone.

The following example illustrates the process of making an EPID suspension in accordance with the present invention.

EXAMPLE I

The suspension is prepared by ballmilling all components for several hours in a teflon jar. This is done to break up the dry agglomerated pigment powder into individual particles and allow the exposed surface to interact with the stabilizer. The inner chamber of the teflon jar is essentially cylindrical in shape. Controlled humidity and temperature are preferred but not necessary. During milling the temperature of the suspension rises to a little over 40° C. The media used are 2.0 mm zirconium beads having a density of 6.0 g/ml. Prior to placement in the jars, the beads are milled twice for 30 minutes in a tetracholorethylene solvent. After each milling, the solvent is strained off and discarded. Three different size jars and bead charges have been tested in which the twice-milled beads plus the suspension fill the jars approximately half-way. The specific test conditions are set forth in Table II.

TABLE II

| JAR HEIGHT | JAR DIAMETER | BEAD CHARGE | SUSPENSION SAMPLE SITE |
|---|---|---|---|
| 48 mm | 61 mm | 200 g | 50 g |
| 68 mm | 81 mm | 400 g | 100 g |
| 113 mm | 81 mm | 800 g | 200 g |

The mill employed is a commercially available paint shaker Model 5410 manufactured by the Red Devil Company. Adapters were placed in the shaker cells to hold the jars. The motion of the mill is in two dimensions. It rotates about 20° in the YZ plane while it moves side to side approximately 15 mm in the X direction. The motion frequency is about 5 cycles per second. The duration of the entire milling process is approximately eight hours.

During the milling procedure, some of the OLOA-1200 is adsorbed into the surface of the beads, forming a coating thereon. It has been found that recycled beads tend to produce higher current mixes than new beads. After milling, the suspension is strained from the beads. At this point, the specific gravity of the mix is measured. If necessary, it is adjusted to make sure it is slightly more dense than the pigment. The suspension is divided into centrifuge tubes and spun at 5000 RPM for 30 minutes. the suspension is transferred to fresh test tubes by carefully drawing out the pigment and most of the liquid. A small amount of liquid and grey-weight dense solid, which has settled out, are left behind. The primary source of the residue is the zirconium oxide. The process of transferring to fresh tubes is repeated three times to ensure adequate removal of unwanted particulate matter.

The specific gravity of the suspension is now adjusted to 1.43 g/ml. Approximately 15 ml of suspension, is exposed to an ultrasonic probe for one minute The probe employed is a Model UP150 manufactured by Sonicor, which probe operates at 40 kHz and has a maximum power of 1,000 watts. The probe is operated at half-maximum power, which is sufficient to encourage adequate bubble formation, thereby driving out dissolved gasses. The liquid is warmed slightly by this process as well. Filling of the cell should occur as soon as possible after the ultrasonic treatment. Before use in an EPID cell, a portion of the suspension was placed in a diode and the pigment observed moving back and forth therein. At approximately 1.5 Hz, the mixture maintains uniform texture. With the pigment on one electrode of the diode in a field of around 600,000 volts/meter, the steady state current after 30 seconds is measured. A current density of about $4.4 \times 10^{-7}$ amps/cm$^2$ was recorded.

A specially configured EPID test cell was constructed with means for applying timed voltage pulses thereacross. A 4.5"×6.4"×0.014" cell is filled with 7 ml of the suspension and pulses are applied to establish the minimum length of pulse required to move the mix far enough away from one electrode so that the complete transition from yellow to black is observed. In a 2" by 3" diode at approximately 600,000 volts/meter, the pulse length is 80 msec.

The electrophoretic composition in accordance with the present invention provided good overall visual performance and had a very fast response time, particularly during release of the pigment particles from the viewing electrode.

I claim:

1. An electrophoretic display composition comprising:

a suspension medium comprising tetrachloroethylene and sec-butyl benzene;

a dispersion of charged pigment particles suspended in said suspension medium, approximately 50 wt % of said pigment particles being formed in the presence of a surface active agent, said suspension medium having a specific gravity corresponding to that of said pigment particles, said pigment particles defining surfaces having at least one acidic hydrogen site per molecule and said pigment particles being selected from the group consisting of Diarylide yellow Pigment Yellow 14 and Pigment Yellow 55;

a fluid dye dispersed in said suspension medium; and a charge control agent, said charge control agent being adsorbed on said pigment particles and having a basic anchoring group for reacting with said pigment particles to form charge pairs therewith and having a polymer chain extending therefrom, thereby providing a steric barrier between particles.

2. A composition according to claim 1, wherein the specific gravity of said suspension medium is 1.43 g/ml.

3. A composition according to claim 2, wherein said suspension medium is present in a concentration of 98.7% by weight.

4. A composition according to claim 1, wherein said fluid dye has the structure:

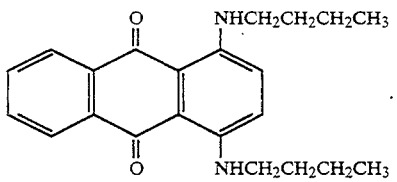

5. A composition according to claim 4, wherein said fluid dye is present in a concentration of 0.12% by weight.

6. A composition according to claim 1, wherein the pigment particles are Pigment Yellow 14.

7. A composition according to claim 1, wherein the surface active agent is a cationic surfactant.

8. A composition according to claim 6, wherein said pigment particles are present in said composition in a concentration of 0.8% by weight.

9. A composition according to claim 1, wherein said charge control agent is an amine having the structure:

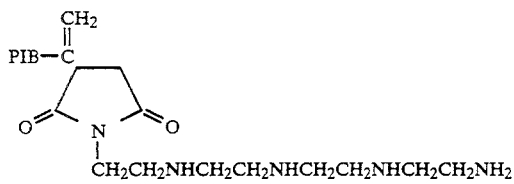

where PIB is a polyisobutylene chain having an effective length of at least 50 angstroms.

10. A composition according to claim 9, wherein said charge control agent is present in a concentration of 0.4% by weight.

11. A process for forming an electrophoretic display composition comprising the steps of:
  treating a first plurality of discrete organic pigment particles with a surface active agent, each of said first plurality of pigment particles defining a surface;
  providing a second plurality of said discrete organic pigment particles which has not been treated with a surfactant, each of said second plurality of pigment particles defining a surface;
  dispersing said first and second plurality of discrete organic pigment particles in a weight ratio of approximately 50:50 in a suspension medium of tetrachloroethylene, substantially each surface having at least one acidic hydrogen site and said first and second plurality of particles being selected from the group consisting of Pigment Yellow 14 and Pigment Yellow 55;
  providing a charge control agent having at least one basic anchoring group in said suspension medium;
  adsorbing said charge control agent on the surfaces of said first and second plurality of particles and reacting said acidic hydrogen sites with said basic anchoring groups, thereby forming charge pairs and polymer chains extending from each surface to provide a stearic barrier between the particles of both said first and second plurality of particles;
  dissolving a solvent dye in said suspension medium; and
  adding an effective amount of secondary-butyl benzene to said suspension medium to obtain a specific gravity of said suspension medium which is substantially the same as that of said first and second plurality of pigment particles.

12. The process according to claim 11, wherein said adsorbing step comprises ball milling said first and second plurality of pigment particles and said charge control agent together for at least two hours.

13. The process according to claim 11, wherein said dissolving step is performed prior to said adsorbing step and wherein said adsorbing step comprises ballmilling said first and second plurality of pigment particles and said charge control agent together for at least eight hours.

14. The process according to claim 11, wherein said solvent dye has the structure:

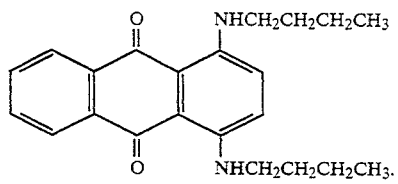

15. The process according to claim 11, further including the step of exposing said suspension medium to an ultrasonic probe to drive out any dissolved gasses.

* * * * *